(12) United States Patent
Gaberthüel et al.

(10) Patent No.: US 10,976,188 B2
(45) Date of Patent: Apr. 13, 2021

(54) THERMAL FLOW MEASURING DEVICE INCLUDING PROBE HAVING PROBE CORE WITH HARD SOLDER

(71) Applicant: Endress+Hauser Flowtec AG, Reinach (CH)

(72) Inventors: Stephan Gaberthüel, Oberwil (CH); Alexander Grün, Lörrach (DE); Hanno Schultheis, Hermrigen (CH); Tobias Baur, Reinach (CH); Martin Barth, Riehen (CH); Anastasios Badarlis, Birsfelden (CH); Lars Neyerlin, Wahlen (CH); Martin Arnold, Reinach (CH); Oliver Popp, Oberwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 35 days.

(21) Appl. No.: 16/347,557

(22) PCT Filed: Oct. 10, 2017

(86) PCT No.: PCT/EP2017/075789
§ 371 (c)(1),
(2) Date: May 3, 2019

(87) PCT Pub. No.: WO2018/082874
PCT Pub. Date: May 11, 2018

(65) Prior Publication Data
US 2019/0293466 A1    Sep. 26, 2019

(30) Foreign Application Priority Data

Nov. 4, 2016 (DE) ..................... 10 2016 121 111.7

(51) Int. Cl.
*G01F 1/68* (2006.01)
*G01F 1/688* (2006.01)
*G01F 15/00* (2006.01)

(52) U.S. Cl.
CPC .......... *G01F 1/6888* (2013.01); *G01F 1/6884* (2013.01); *G01F 15/00* (2013.01)

(58) Field of Classification Search
None
See application file for complete search history.

(56) References Cited

U.S. PATENT DOCUMENTS

| 5,271,138 A | 12/1993 | Frias et al. |
| 2005/0223828 A1 | 10/2005 | Olin |

(Continued)

FOREIGN PATENT DOCUMENTS

| CN | 101788313 A | 7/2010 |
| CN | 204718656 U | 10/2015 |

(Continued)

OTHER PUBLICATIONS

Search Report for German Patent Application No. 10 2016 121 111.7, German Patent Office, dated May 26, 2017, 5 pp.

(Continued)

*Primary Examiner* — Harshad R Patel
(74) *Attorney, Agent, or Firm* — Christopher R. Powers; Endress+Hauser (USA) Holding Inc.

(57) ABSTRACT

The present disclosure relates to a method for manufacturing a probe of a thermal, flow measuring device for measuring mass flow of a liquid in a measuring tube, wherein the method includes: introducing a probe core including a hard solder and a core element into a first probe sleeve, wherein the first probe sleeve has an open first end and a closed second end away from the first end; melting the hard solder; affixing the core element by cooling the hard solder to a (Continued)

temperature less than the solidification temperature; and applying a thermoelement to a contact area of the core element or of the solidified hard solder. The present disclosure relates, furthermore, to a probe resulting from the manufacturing process as well as to a flow measuring device having at least one probe of the-present disclosure.

14 Claims, 5 Drawing Sheets

(56) References Cited

U.S. PATENT DOCUMENTS

| | | |
|---|---|---|
| 2009/0260431 A1 | 10/2009 | Olin et al. |
| 2013/0269428 A1 | 10/2013 | Baur et al. |

FOREIGN PATENT DOCUMENTS

| | | |
|---|---|---|
| DE | 102008015359 A1 | 9/2009 |
| DE | 102009028850 A1 | 3/2011 |
| DE | 102010031127 A1 | 1/2012 |
| DE | 102011089597 A1 | 6/2013 |

OTHER PUBLICATIONS

Search Report for International Patent Application No. PCT/EP2017/075789, WIPO, dated Feb. 13, 2018, 11 pp.
"Brazing of electro-vacuum devices and ceramic-metal sealing", Liu Lianbao, pp. 149-151, National Defense Industry Press, Aug. 1978.

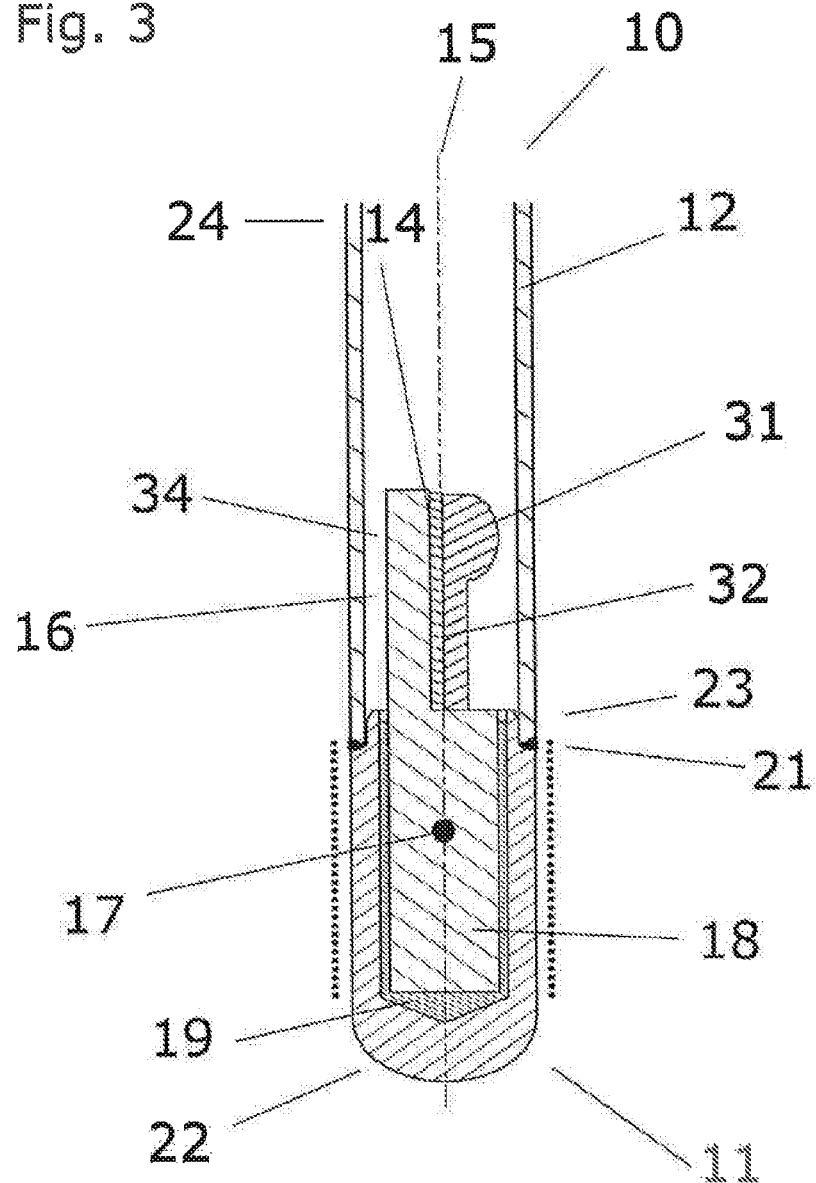

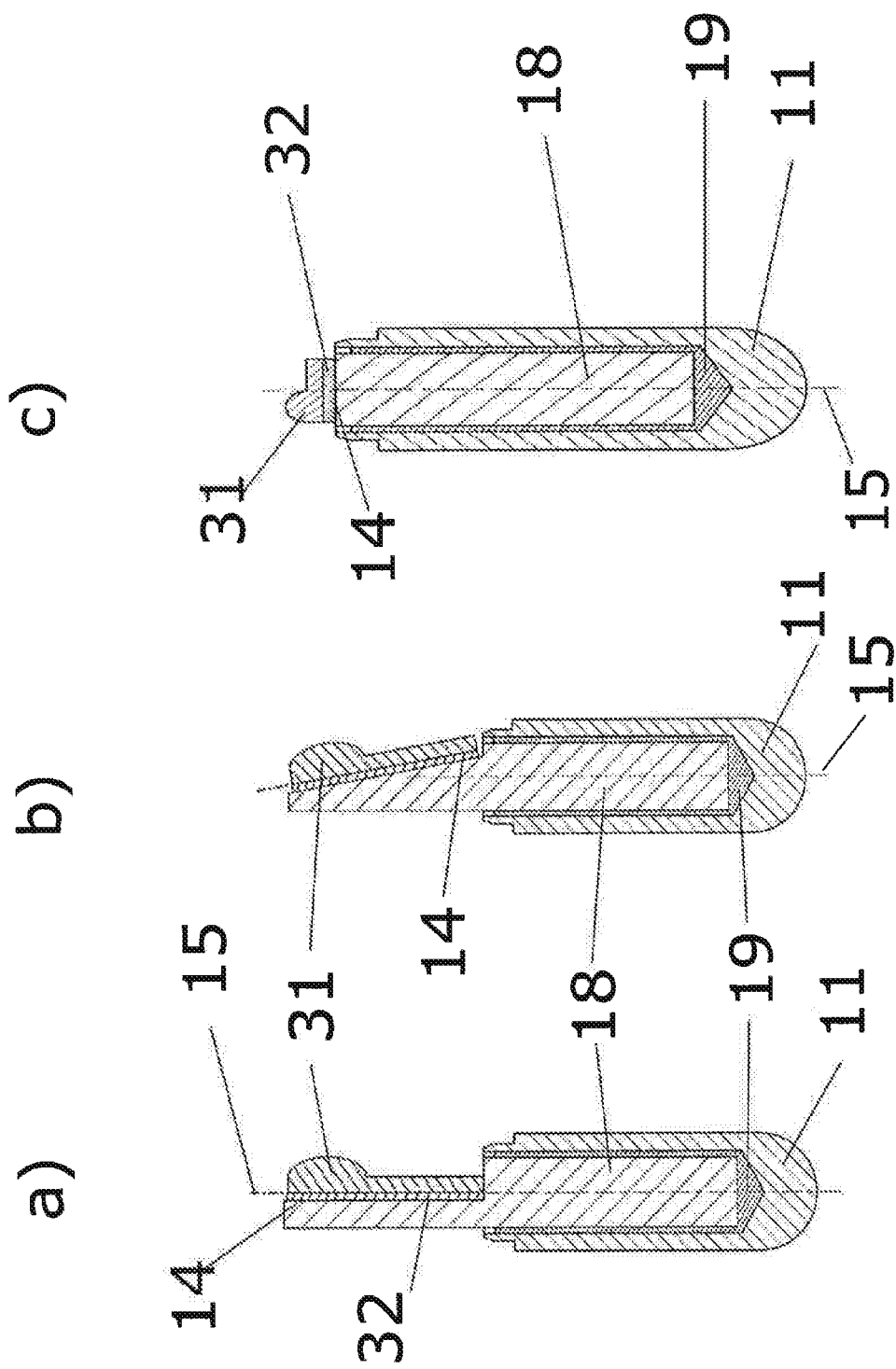

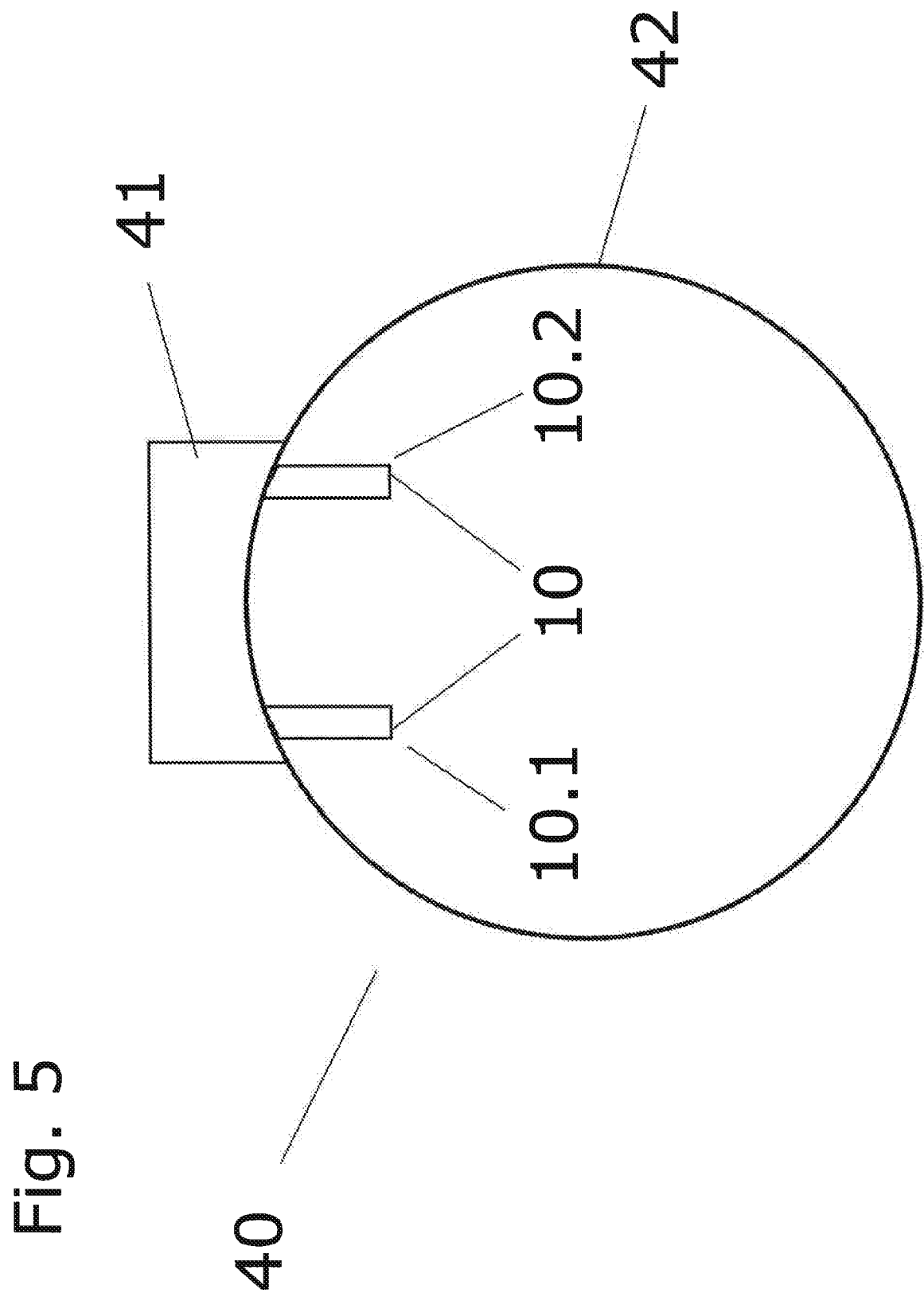

THERMAL FLOW MEASURING DEVICE INCLUDING PROBE HAVING PROBE CORE WITH HARD SOLDER

CROSS-REFERENCE TO RELATED APPLICATIONS

The present application is related to and claims the priority benefit of German Patent Application No. 10 2016 121 111.7, filed on Nov. 4, 2016 and International Patent Application No. PCT/EP2017/075789 filed on Oct. 10, 2017, the entire contents of which are incorporated herein by reference.

TECHNICAL FIELD

The invention relates to a method for manufacturing a probe of a thermal, flow measuring device for measuring mass flow of a liquid in a measuring tube, to a probe and to a flow measuring device.

BACKGROUND

Thermal, flow measuring devices have long been a part of the state of the art. One or more probes are introduced into a liquid flowing through a measuring tube, wherein the probes are adapted to measure the temperature of the liquid or to heat the liquid. For example, the temperature measuring probe can be arranged downstream of the heating probe, so that the temperature measuring probe is heated via the liquid heated by the heating probe.

Important for a high measurement accuracy of a thermal, flow measuring device and for a low measurement accuracy fluctuation between different flow measuring devices of the same type is a constant quality of construction of the utilized probes. Important for a high sensitivity of the probes in reference to fast temperature fluctuations of the liquid is a low heat transfer resistance between a contact area of the probe with the liquid and a heating, or temperature measuring, thermoelement.

The state of the art, for example, DE102008015359A1, discloses a probe with a probe sleeve, which probe sleeve contains a thermoelement embedded in a fill material. Disadvantageous in the case of such a solution is that a fill material, on the one hand, causes fluctuations between different probes of a series as regards heat transfer between probe and a liquid surrounding the probe and, on the other hand, the fill material can be a factor with reference to aging of the probe, so that, over time, such a probe must be recalibrated, in order to prevent measurement errors.

SUMMARY

An object of the invention is, consequently, a probe, which has improved stability as regards its manufacture and as regards its long-term behavior.

A method of the invention for manufacturing a probe of a thermal, flow measuring device for measuring mass flow of a liquid in a measuring tube includes, in such case, steps as follows: introducing a probe core comprising a hard solder and a core element into a first probe sleeve, wherein the first probe sleeve has an open first end and a closed second end away from the first end; melting the hard solder; affixing the core element by cooling the hard solder to a temperature less than the solidification temperature; applying a thermoelement to a contact area of the core element or of the solidified hard solder.

In an embodiment of the method, after solidification of the hard solder, the hard solder completely surrounds the core element.

In an embodiment of the method, the core element has a center of mass, a second end toward the second end on one side of the center of mass and a first end away from the second end on the other side of the center of mass, wherein after solidification of the hard solder the first end of the core element is at least partially free of hard solder.

In an embodiment of the method, the contact area for the application of the thermoelement is prepared by mechanical processing.

In an embodiment of the method, after application of a thermoelement on the contact area, a second probe sleeve with an open third end and an open fourth end is joined, especially welded, via the third open end leak tightly to the first end, wherein the second probe sleeve completely grips around a first region of the probe core.

In an embodiment of the method, the first region of the probe core is spaced in a subregion from all surfaces of the first probe sleeve and/or the second probe sleeve, wherein the subregion includes all first cross sections of the probe core, which first cross sections intersect or contact the contact area.

In an embodiment of the method, the thermoelement is placed on the contact area by means of a solder- or sinter layer.

A probe of the invention for a thermal, flow measuring device for measuring mass flow of a liquid in a measuring tube includes: a first probe sleeve with an open first end and a closed second end; a probe core, which at least partially fills out the first probe sleeve, wherein the probe core has a hard solder and a core element; a thermoelement, which is thermally coupled with the probe core, wherein the thermoelement is adapted to increase or to register the temperature of the probe core; wherein the probe core is formed by melting the hard solder in the first probe sleeve.

In an embodiment of the probe, the probe core includes a first longitudinal axis, a lateral surface mechanically connected with the first probe sleeve, a center of mass, and a contact area away from the second end of the probe core on the other side of the center of mass, wherein the thermoelement is placed on the contact area by means of a solder- or sinter layer, wherein the contact area is an area of the core element and/or of the hard solder.

In an embodiment of the probe, the probe core includes a first region, which protrudes out from the first probe sleeve in the axial direction, wherein the first region contains the contact area.

In an embodiment of the probe, the first region is surrounded by a second probe sleeve with an open third end and an open fourth end, which second probe sleeve is joined, especially welded, via the third end leak tightly to the open first end of the first probe sleeve, wherein the first region is spaced in a subregion from all surfaces of the first probe sleeve and/or second probe sleeve, wherein the subregion includes all first cross sections of the probe core, which intersect or include first cross sections of the contact area.

In an embodiment of the probe, the first probe sleeve comprises a stainless steel; and the core element comprises copper or silver; wherein the hard solder has a melting temperature below the melting temperature of the core element. Typically, a hard solder has a melting temperature lower than 1000 degrees Celsius. Typically, a hard solder has a melting temperature greater than 400 degrees Celsius.

In an embodiment of the probe, the hard solder comprises silver or copper, wherein the hard solder can have at least one other component, which other component is selected from the following list: palladium, nickel, tin, gold, indium.

A thermal, flow measuring device of the invention for measuring mass flow of a liquid in a measuring tube and having at least one probe of the invention includes: a measuring tube with a second longitudinal axis; wherein the at least one probe is introduced into the measuring tube; an electronic operating circuit, which is adapted to operate the at least one probe.

In an embodiment of the flow measuring device, the thermal, flow measuring device includes at least two probes, wherein the electronic operating circuit is adapted to heat at least a first probe, wherein the electronic operating circuit is adapted to determine the temperature of the liquid by means of at least a second probe.

BRIEF DESCRIPTION OF THE DRAWING

The invention will now be described based on examples of embodiments illustrated in the appended drawing, the figures of which show as follows:

FIG. 3 shows an enlarged and not to scale view of the manufacturing stage illustrated in FIG. 2(c);

FIGS. 4(a)-4(c) show schematic examples of embodiments of the probe of the invention; and FIG. 5 shows a schematic front view of a thermal, flow measuring device having two probes of the invention.

DETAILED DESCRIPTION

Figure 1:
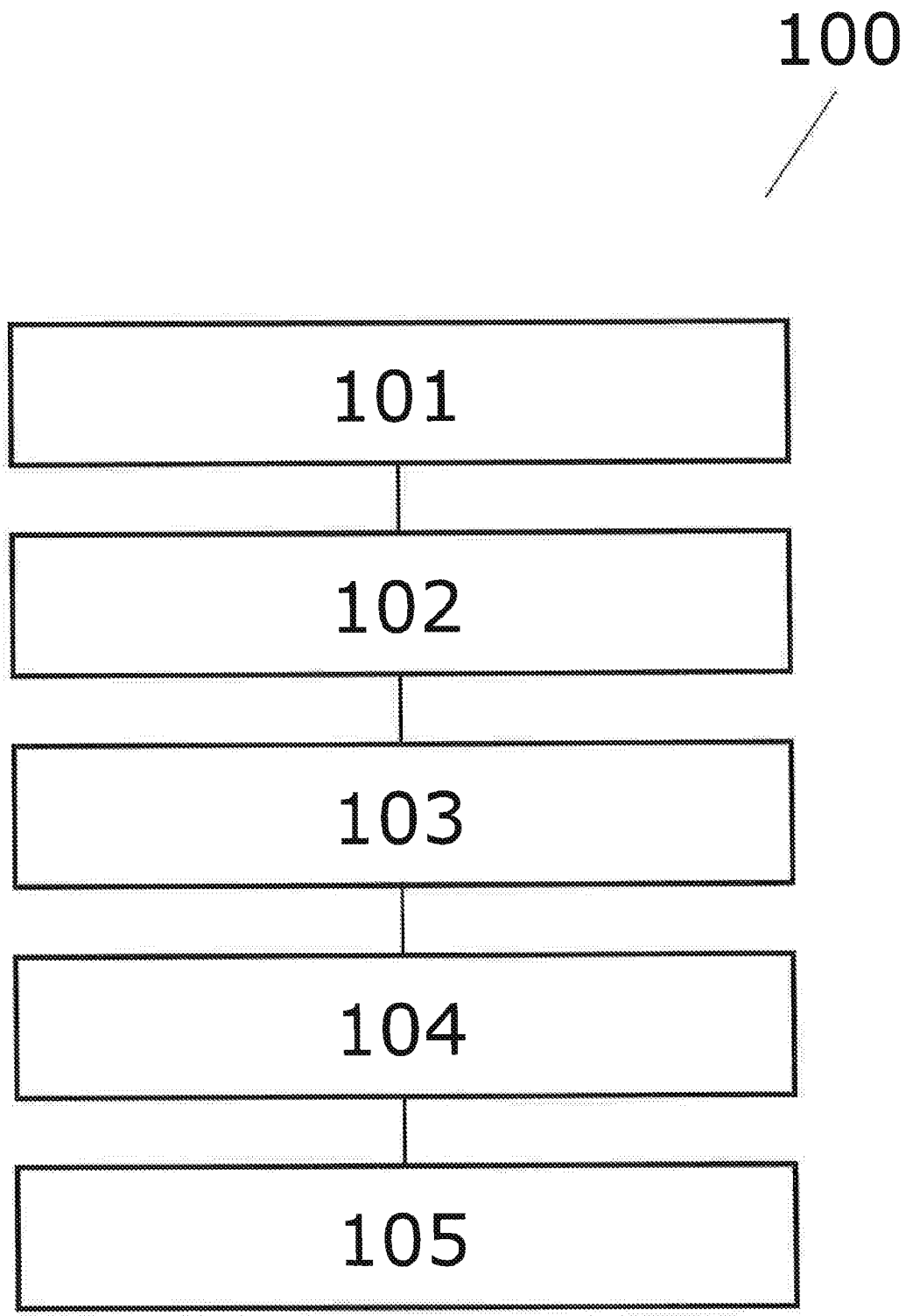
FIG. 1 shows a schematic process flow diagram of manufacture of a probe of the invention.

FIG. 1 shows a form of embodiment of a process flow 100 for manufacture of a probe 10 of the invention.

In a first step 101, a probe core 13 comprising a core element 18 and a hard solder 19 is inserted into a first probe sleeve 11, wherein the core element 18 comprises copper or silver, and wherein the first probe sleeve 11 is formed of a stainless steel, and wherein the first probe sleeve 11 has an open first end 21 and a closed second end 22 away from the first end.

In a second step 102, the hard solder 19 is melted, so that the liquid material of the hard solder 19 collects in an intermediate region between core element 18 and first probe sleeve 11 down to the closed second end 22 of the first probe sleeve 11. While the hard solder 19 is liquid, there arises in an interface between hard solder 18 and first probe sleeve 11 and in an interface between hard solder 18 and core element 18, in each case, an intermetallic connecting layer, in which the material of the hard solder 19 mixes with the material of the first probe sleeve 11, and with the material of the core element 19, as the case may be.

In a third step 103, the probe core 13 is cooled to a temperature less than the solidification temperature of the hard solder 19. Due to the forming of the intermetallic connecting layers, the contact between probe core 13 and first probe sleeve 11 remains after solidification of the probe core.

In a fourth step 104, a thermoelement is placed by means of a solder-, or sinter layer on a contact area 14 of the probe core 13.

In a fifth step 105, a second probe sleeve 12 with an open third end 23 and an open fourth end 24 is joined, especially welded, via the open third end leak tightly to the open first end 21 of the first probe sleeve, wherein the second probe sleeve 12 completely grips around a first region of the probe core 13, wherein the probe core in a subregion 16 of the first region is spaced from all surfaces of the first probe sleeve 11 and/or the second probe sleeve 12.

Figure 2:
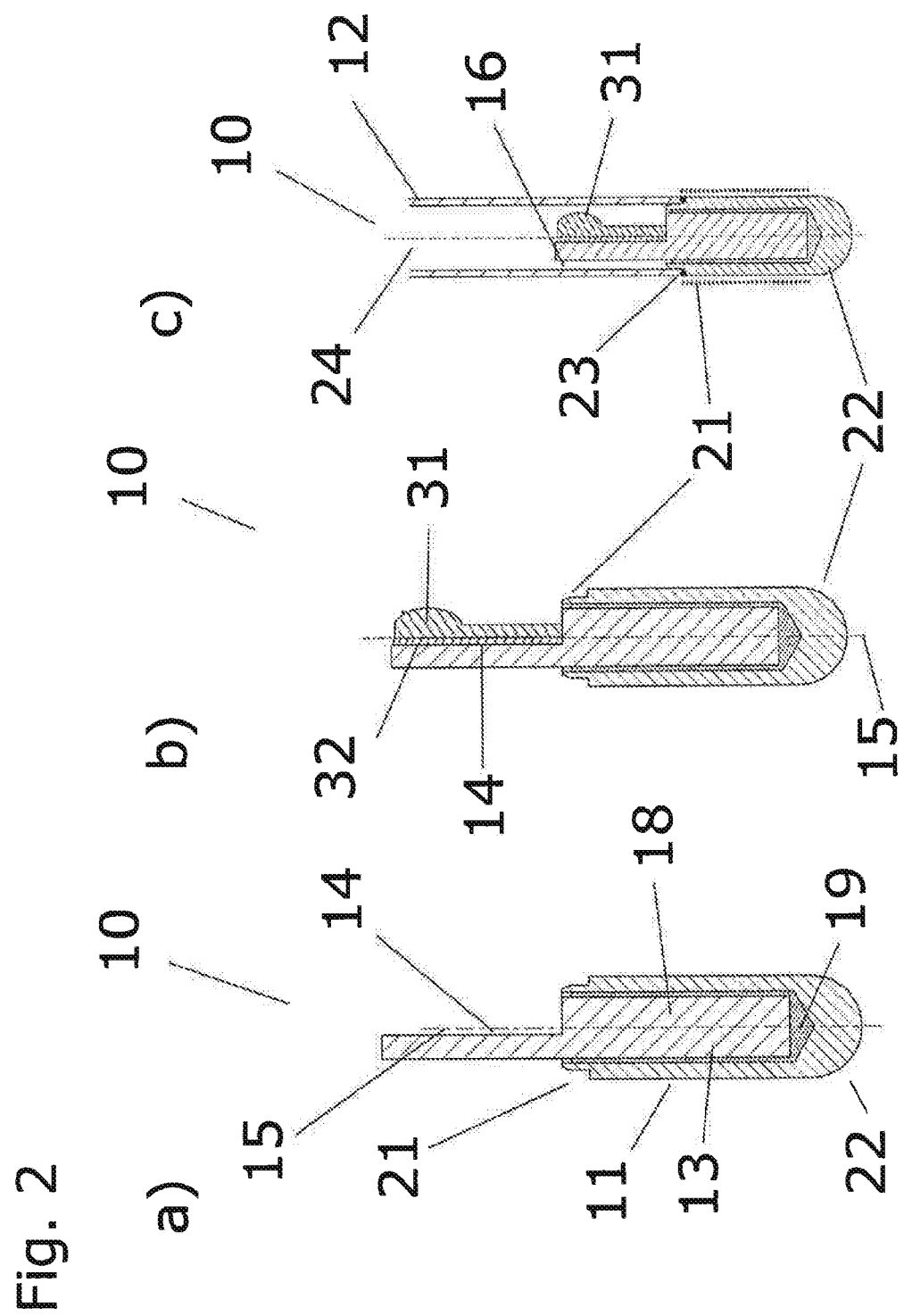
FIGS. 2(a)-2(c) show cross sections of a probe of the invention in different stages of manufacture.

FIG. 2 shows cross sections of a probe 10 of the invention in different stages of manufacture.

FIG. 2 a) shows a cross section of the probe 10 in a phase, in which the first probe sleeve 11 contains the probe core 13 composed of core element 18 and hard solder 19, wherein the figure could represent the hard solder in the liquid state or in the solidified state. First probe sleeve 11 has the open first end 21 and the closed second end 22. Core element 18 includes, in such case, the contact area 14, which is adapted to accommodate the thermoelement 31.

FIG. 2 b) shows a cross section of the probe 10 in a phase, in which after solidification and cooling of the hard solder 19 the thermoelement 31 is placed on the contact area 14 of the core element 18 by means of a solder-, or sinter layer 32.

FIG. 2 c) shows a cross section of a readied probe 10 with a second probe sleeve 12, which is joined, especially welded, via a third end 23 of the second probe sleeve to the first end 21 of the first probe sleeve 11.

FIG. 3 shows an enlarged view of the cross section of the readied probe 10 shown in FIG. 2 c), wherein the presentation is horizontally not to scale, in order to show details better.

Thermoelement 31 is held on the contact area 14 of the core element 18 via a solder-, or sinter layer 32. Core element 18 has a center of mass 17 and is, in such case, embodied in the subregion 16 in such a manner that it is spaced from all surfaces of the second probe sleeve 12. The separation of the core element 18 from the second probe sleeve, or from the first probe sleeve and the second probe sleeve in the subregion 16 leads to a homogeneous distribution of temperature in the probe core 13. In this way, in the case of application of the probe 10 as a heating element, a uniform heat emission to the liquid in the dotted region is assured. Conversely, in the case of application of the probe as a temperature sensor, a uniform loading of the thermoelement 31 with the temperature of the liquid is assured.

FIGS. 4 a) to c) show schematic cross sections of three forms of embodiment for the probe of the invention, wherein for purposes of perspicuity the second probe sleeve is not shown. FIG. 4 a) shows the form of embodiment shown in FIGS. 2 a) to d) and in FIG. 3. FIG. 4 b) shows a form of embodiment with contact area 14 inclined relative to the first longitudinal axis 15. FIG. 4 c) shows a form of embodiment with contact area 14 perpendicular to the longitudinal axis 15. The forms of embodiment shown in FIGS. 4 a) and b) enable manufacture of thin probes in the case of a given thermoelement 31.

FIG. 5 shows a schematic front view of a thermal, flow measuring device 40 of the invention with a measuring tube 42, two probes 10 of the invention, which are arranged in the lumen of the measuring tube 42, and a housing 41, which has an electronic operating circuit, which is adapted to operate the probes 10.

In order to measure the mass flow of a liquid through the measuring tube 42, for example, a probe 10.1 in the liquid flowing through the measuring tube 42 is heated in such a manner that a temperature difference remains constant relative to the media temperature. Advantageously, a second probe 10.2 is used for temperature measurement of the liquid and is arranged before or as shown in FIG. 2 beside the heated probe 10.1, in order to maintain the temperature difference. Assuming that media properties, such as density or composition, remain constant, the mass flow of the liquid can be ascertained via the heating current needed for holding the temperature.

The probes 10 can also be arranged one after the other in the flow direction, wherein a first, upstream probe heats the liquid flowing past and thus also a second, downstream probe. In such case, the heating power of the first probe required for maintaining a temperature difference is inversely proportional to the flow velocity of the liquid.

The invention claimed is:

1. A method for manufacturing a probe of a thermal, flow measuring device for measuring mass flow of a liquid in a measuring tube, the method comprising:
   introducing a distal end of a probe core including a hard solder and a core element into a first probe sleeve, wherein the first probe sleeve has an open first end and a closed second end opposite the first end, and wherein the hard solder is disposed at or about the distal end of the probe core;
   subsequent to introducing the probe core into the first probe sleeve, melting the hard solder of the probe core;
   affixing the core element within the first probe sleeve by cooling the melted hard solder to a temperature less than a solidification temperature of the hard solder; and
   applying a thermoelement to a contact area of the core element at or near a proximal end thereof or of the cooled hard solder about the proximal end of the core element.

2. The method of claim 1, wherein, after cooling the melted hard solder, the hard solder completely surrounds the core element but for the proximal end of the probe core.

3. The method of claim 1, wherein the core element has a center of mass, the distal end on one side of the center of mass and the opposing proximal end on another side of the center of mass, wherein, after cooling the melted hard solder, the proximal end of the core element is at least partially free of hard solder.

4. The method of claim 1, wherein, after applying the thermoelement to the contact area, a second probe sleeve having an open third end and an open fourth end is joined at the third open end leak-tightly to the first end of the first probe sleeve, wherein the second probe sleeve surrounds the proximal end of the probe core.

5. The method of claim 4, wherein the proximal end of the probe core is spaced in a subregion from all surfaces of the first probe sleeve and/or the second probe sleeve, wherein the subregion includes all cross-sections of the probe core that intersect or contact the contact area.

6. The method of claim 1, wherein the thermoelement is applied to the contact area using a solder or sinter layer.

7. A probe of a thermal flow measuring device for measuring mass flow of a liquid in a measuring tube, the probe comprising: a first probe sleeve with an open first end and a closed second end; a probe core, which at least partially fills the first probe sleeve, wherein the probe core includes a core element surrounded by a hard solder at a distal end thereof; and a thermoelement thermally coupled to a contact area of the probe core at or near a proximal end of the core element, wherein the thermoelement is adapted to increase or to register a temperature of the probe core, wherein the probe is fabricated by melting the hard solder of the probe core in the first probe sleeve.

8. The probe of claim 7, wherein the probe core includes a longitudinal axis, a lateral surface mechanically connected with the first probe sleeve, a center of mass, and a contact area opposite the second end of the first probe sleeve, wherein the thermoelement is applied to the contact area using a solder or sinter layer, and wherein the contact area is an area of the core element and/or of the hard solder.

9. The probe of claim 7, wherein the probe core includes a portion, which protrudes from the first probe sleeve in an axial direction, wherein the portion includes the contact area.

10. The probe of claim 9, further comprising a second probe sleeve including an open third end and an open fourth end, wherein the second probe sleeve is joined at the third end in a leak-tight manner to the open first end of the first probe sleeve such that the portion of the probe core is surrounded by the second probe sleeve, wherein the portion is spaced in a subregion from all surfaces of the first probe sleeve and/or second probe sleeve, and wherein the subregion includes all cross-sections of the probe core that intersect or include the contact area.

11. The probe of claim 7, wherein the first probe sleeve is made of a stainless steel, wherein the hard solder has a melting temperature below a melting temperature of the core element, and wherein the core element has a thermal conductivity greater than 100 W/(m·K), wherein the core element includes at least one material from the group consisting of copper, silver, aluminum, nickel, indium, gold and tin.

12. The probe of claim 11, wherein the hard solder includes silver or copper.

13. A thermal flow measuring device for measuring mass flow of a liquid in a measuring tube, the measuring device comprising: a measuring tube with a longitudinal axis; at least one probe extending into the measuring tube, the at least one probe comprising: a first probe sleeve with an open first end and a closed second end; a probe core, which at least partially fills the first probe sleeve, wherein the probe core includes a core element surrounded by a hard solder at a distal end thereof; and a thermoelement thermally coupled to a contact area of the probe core at or near a proximal end of the core element, wherein the thermoelement is adapted to increase or to register the temperature of the probe core, wherein the probe is fabricated by melting the hard solder of the probe core in the first probe sleeve; and an electronic operating circuit configured to operate the at least one probe.

14. The measuring device of claim 13, wherein the at least one probe further comprising at least two probes, including a first probe and at least a second probe, wherein the electronic operating circuit is configured to heat at least the first probe, and wherein the electronic operating circuit further configured to determine a temperature of the liquid using the at least second probe.

* * * * *